United States Patent
Wang

(10) Patent No.: US 10,688,958 B2
(45) Date of Patent: Jun. 23, 2020

(54) GUIDING DEVICE FOR A SEAT BELT SYSTEM

(71) Applicant: Liang-Hsiung Wang, Tainan (TW)

(72) Inventor: Liang-Hsiung Wang, Tainan (TW)

(*) Notice: Subject to any disclaimer, the term of this patent is extended or adjusted under 35 U.S.C. 154(b) by 196 days.

(21) Appl. No.: 15/823,657

(22) Filed: Nov. 28, 2017

(65) Prior Publication Data

US 2018/0170304 A1   Jun. 21, 2018

(30) Foreign Application Priority Data

Dec. 16, 2016 (TW) .............................. 105141931 A

(51) Int. Cl.
*B60R 22/24* (2006.01)
*B60R 22/28* (2006.01)
*B60R 22/19* (2006.01)
*B60R 22/18* (2006.01)

(52) U.S. Cl.
CPC .............. *B60R 22/24* (2013.01); *B60R 22/19* (2013.01); *B60R 22/28* (2013.01); *B60R 2022/1818* (2013.01); *B60R 2022/1831* (2013.01)

(58) Field of Classification Search
CPC ......... B60R 22/24; B60R 22/28; B60R 22/20; B60R 22/18; B60R 22/19; B60R 2022/1818; B60R 2022/1831
USPC ................... 248/580; 280/808, 801.2, 801.1; 297/483, 468, 470, 471
See application file for complete search history.

(56) References Cited

U.S. PATENT DOCUMENTS

| | | | | |
|---|---|---|---|---|
| 2004/0253048 A1* | 12/2004 | Schulz | ................... | B60R 22/24 403/122 |
| 2006/0170200 A1* | 8/2006 | Sundararajan | .......... | B60R 21/18 280/733 |

* cited by examiner

*Primary Examiner* — Keith J Frisby
(74) *Attorney, Agent, or Firm* — Alan D. Kamrath; Karin L. Williams; Mayer & Williams PC

(57) ABSTRACT

A guiding device for a seat belt system has a guiding ring, a moving seat, and an elastic member. The moving seat is slidably mounted on the guiding ring and is moveable upward and downward. The elastic member is connected between the guiding ring and the moving seat for providing an elastic force to the moving seat. When a webbing of the seat belt system is pulled, the moving seat is pulled by the webbing and moves downwardly. The elastic member is stretched to generate a cushioning resilience to reduce the pulling force. The structure of the guiding device is compact, so the guiding device is low-cost in manufacture and small in volume without occupying much space.

20 Claims, 15 Drawing Sheets

GUIDING DEVICE FOR A SEAT BELT SYSTEM

This application claims the benefit of Taiwan patent application No. 105141931, filed on Dec. 16, 2016, the entire contents of which are incorporated herein by reference.

BACKGROUND OF THE INVENTION

1. Field of the Invention

The present invention relates to a guiding device, and more particularly to a guiding device that is mounted in a vehicle for a webbing of the seat belt to pass through and generates a cushioning resilience.

2. Description of Related Art

A seat belt system mounted in a vehicle is used to protect every occupant seated in the vehicle. A webbing of the seat belt system is obliquely passed the front of the occupant's torso. A guiding device is mounted in the vehicle above the occupant's shoulders. The webbing extracting from a retractor of the seat belt system is passing through the guiding device. The guiding device provides effects on guiding, supporting, and force bearing.

With reference to FIG. 18, a conventional guiding device 80 has a guiding ring 81 and a connecting element 82 connected to the guiding ring 81. The connecting element 82 is fixed in the vehicle. A webbing passes through the guiding ring 81. The components of the conventional guiding device 80 are made of rigid elements. The conventional guiding device 80 cannot generate a cushioning resilience. When the webbing is pushed outwardly by occupant force, the impact force acting on the conventional guiding device 80 is often very strong.

For providing a buffering effect for the webbing of the seat belt system, another conventional guiding device having the buffering effect is provided. With reference to FIG. 19, the guiding device 90 for the seat belt system has a first connecting element 91, a guiding ring 92, a second connecting element 93, and a connecting strap assembly 94. The guiding ring 92 is disposed below the first connecting element 91. The second connecting element 93 is mounted on the guiding ring 92. A connecting strap assembly 94 is connected between the first connecting element 91 and the second connecting element 93. The connecting strap assembly 94 has a woven strap 941 and two resilient straps 942. Two ends of the woven strap 941 are respectively connected to the first connecting element 91 and the second connecting element 93. The middle of the woven strap 941 is folded to form a folded portion. The resilient straps 942 are respectively mounted on two sides of the folded portion. The guiding device 90 for the seat belt system is mounted in the vehicle by the first connecting element 91. The webbing 8 passes through the guiding ring 92.

After the occupant is seated in the vehicle and fasten the seat belt, the guiding device 90 of the seat belt system supports webbing to sustain the force. The connecting strap assembly 94 having the two resilient straps 942 connecting the woven strap 941 can provide a cushioning resilience. When the vehicle is braking, inertia carries the occupant to lean forward and pulls the webbing 8. The guiding device for the seat belt system 90 is pulled by the webbing 8. The connecting strap assembly 94 provides the cushioning resilience to reduce an impact force.

Although the connecting strap assembly 94 of the guiding device 90 of the seat belt system provides the cushioning resilience, the resilient straps 942 of the connecting strap assembly 94 may stretch to provide the cushioning resilience. The connecting strap assembly 94 is made of textile. Textile has lower tensile strength and is easier to break. When the connecting strap assembly 94 breaks, the seat belt system fails to function.

The guiding device 90 of the seat belt system is composed of the first connecting element 91, the guiding ring 92, the second connecting element 93, and the connecting strap assembly 94. The woven strap 941 is folded and the two resilient straps 942 are respectively sewed on two sides of the folded portion of the woven strap 941. The connecting strap assembly 94 is large in volume and occupies much space, and the manufacturing cost is high. Furthermore, the connecting strap assembly 94 is flexible. The operation of the guiding device 90 is not steady during the process of the webbing 8 pulling the guiding device 90.

To overcome the shortcomings, the present invention provides a guiding device for a seat belt system to mitigate or obviate the aforementioned problems.

SUMMARY OF THE INVENTION

The objective of the invention is to provide a guiding device that can solve the problems of the conventional guiding device for a seat belt system including that the volume is large, the connecting strap assembly occupies much space, the operation is not steady, the cost is high, and the seat belt system fails to function when the connecting strap assembly is broken.

The guiding device has a guiding ring, a moving seat, and an elastic member. The guiding ring has a frame and an activity space. The frame has a connecting hole formed through the frame. The activity space is formed through the frame beside the connecting hole. The moving seat is slidably mounted on the guiding ring, is located in the activity space of the guiding ring, moves upwardly and downwardly in the activity space of the guiding ring, and has a through hole formed through the moving seat. The elastic member is connected between the guiding ring and the moving seat.

The guiding device can be adapted to a seat belt system in a vehicle and has the following advantages:

1. Cushion effect: the guiding ring of the guiding device is mounted in the vehicle. A webbing of the seat belt system extracting from a retractor of the seat belt system is inserted through the moving seat slidably mounted on the guiding ring. The elastic member is connected between the guiding ring and the moving seat, and provides an upward elastic force to the moving seat. The guiding device supports webbing to sustain the force. When the webbing is pulled, the moving seat is guided by the guiding ring and moves downwardly. The elastic member is stretched and provides an elastic force to generate a cushioning resilience. The force applied to the moving seat by the webbing is counteracted. The impact force acted on the guiding device by the webbing is reduced.

2. Operation stability: a rigid guiding slide structure provides operation stability when moving seat is sliding within activity space of the guiding ring.

3. Small volume and reduced space occupation: the guiding device is composed of the guiding ring, the moving seat slidably mounted on the guiding ring, and the elastic member connected between the guiding ring and the moving seat.

The structure of the guiding device is compact. The guiding device is small in volume and does not occupy much space.

4. Low cost: The guiding device is minimized in volume. The structure of the guiding device is simple and the manufacture of the guiding device is easy. The manufacture cost of the guiding device is low.

5. Guiding device remains functional despite of loss of the cushion effect: the movement of the moving seat is restricted by the guiding ring, which is annular. The elastic member is connected between the guiding ring and the moving seat. The webbing is inserted through the moving seat. The guiding ring and the moving seat are both rigid elements. The guiding ring mounted in the vehicle to sustain the force. Even though the elastic member connected between the guiding ring and the moving seat is broken and the cushion function is lost, the rigid guiding ring fixedly mounted on the vehicle and the moving seat mounted in the guiding ring still support the webbing to sustain the force. The function of the seat belt system remains normal without failing.

The guiding device further has a protective layer mounted on an outer surface of the moving seat. The protective layer encloses the through hole for protecting the webbing.

The guiding device further has a shell mounted out of the guiding ring for protecting the guiding ring and the elastic member.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
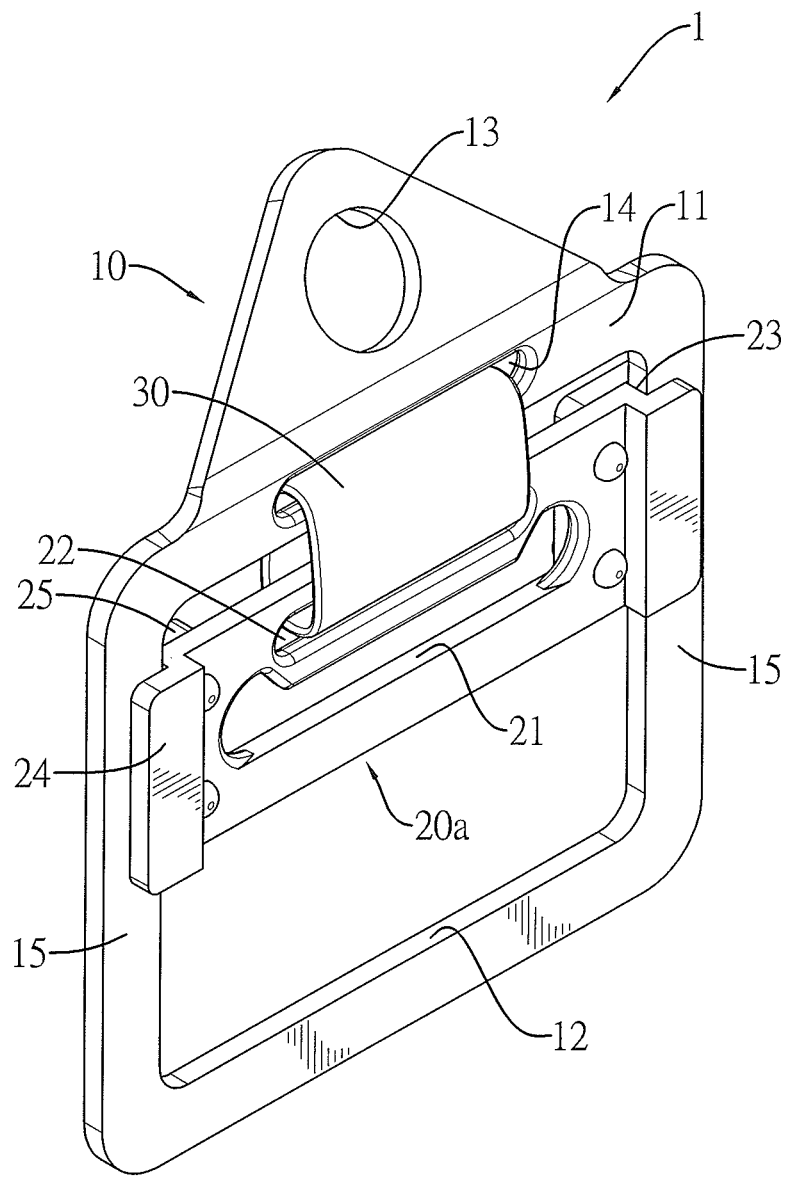
FIG. 1 is a perspective view of a first embodiment of a guiding device for a seat belt system in accordance with the present invention.
Figure 2:
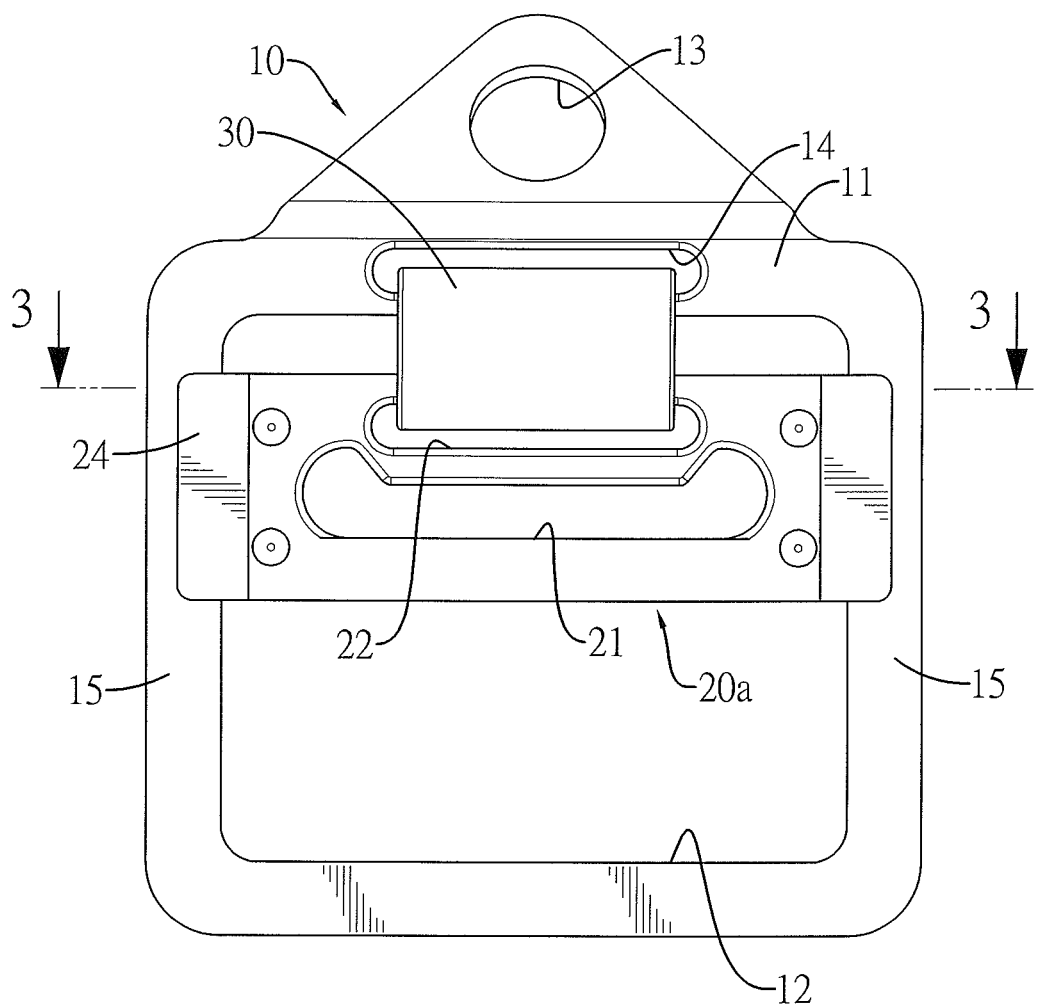
FIG. 2 is a front view of the guiding device in FIG. 1.
Figure 3:
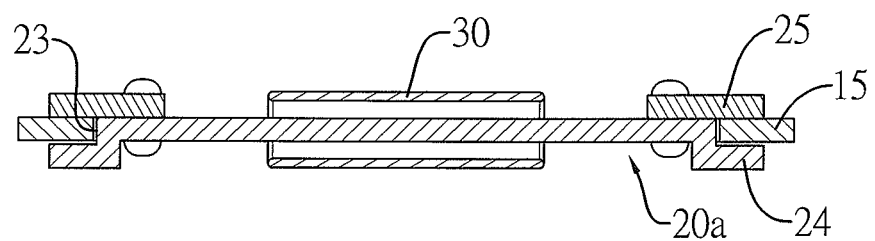
FIG. 3 is a top side view of the guiding device along line 3-3 in FIG. 2.

With reference to FIGS. 1 to 3, a first embodiment of a guiding device 1 for a seat belt system in accordance with the present invention comprises a guiding ring 10, a moving seat 20a, and an elastic member 30.

The guiding ring 10 is a rigid element. The guiding ring 10 has a frame 11 and an activity space 12. The frame 11 has a connecting hole 13. The connecting hole 13 is formed through the frame 11. The activity space 12 is formed through the frame 11 and is disposed beside the connecting hole 13 of the guiding ring 10.

The moving seat 20a is a rigid element. The moving seat 20a is slidably mounted on the guiding ring 10, and is mounted in the activity space 12 of the guiding ring 10. Two sides of the moving seat 20a are movably connected to the guiding ring 10. The moving seat 20a moves upwardly and downwardly in the activity space 12 of the guiding ring 10. The moving seat 20a has a through hole 21 formed through the moving seat 20a.

The elastic member 30 is connected between the guiding ring 10 and the moving seat 20a. The moving seat 20a is located at an upper section of the guiding ring 10, and the guiding ring 10 provides a space allowing the moving seat 20a to move downwardly by an elastic force supplied by the elastic member 30. With reference to FIG. 1, the elastic member 30 is an elastic band, but not limited to.

With reference to FIGS. 1 and 2, the elastic member 30 is the elastic band. The guiding ring 10 has a first hole 14 formed through the frame 11. The first hole 14 is located between the activity space 12 of the guiding ring 10a and the connecting hole 13 of the frame 11. The moving seat 20a has a second hole 22. The second hole 22 is formed through the moving seat 20a and is located above the through hole 21 of the moving seat 20a. The elastic member 30 is inserted through the first hole 14 of the guiding ring 10 and the second hole 22 of the moving seat 20a.

Figure 4:
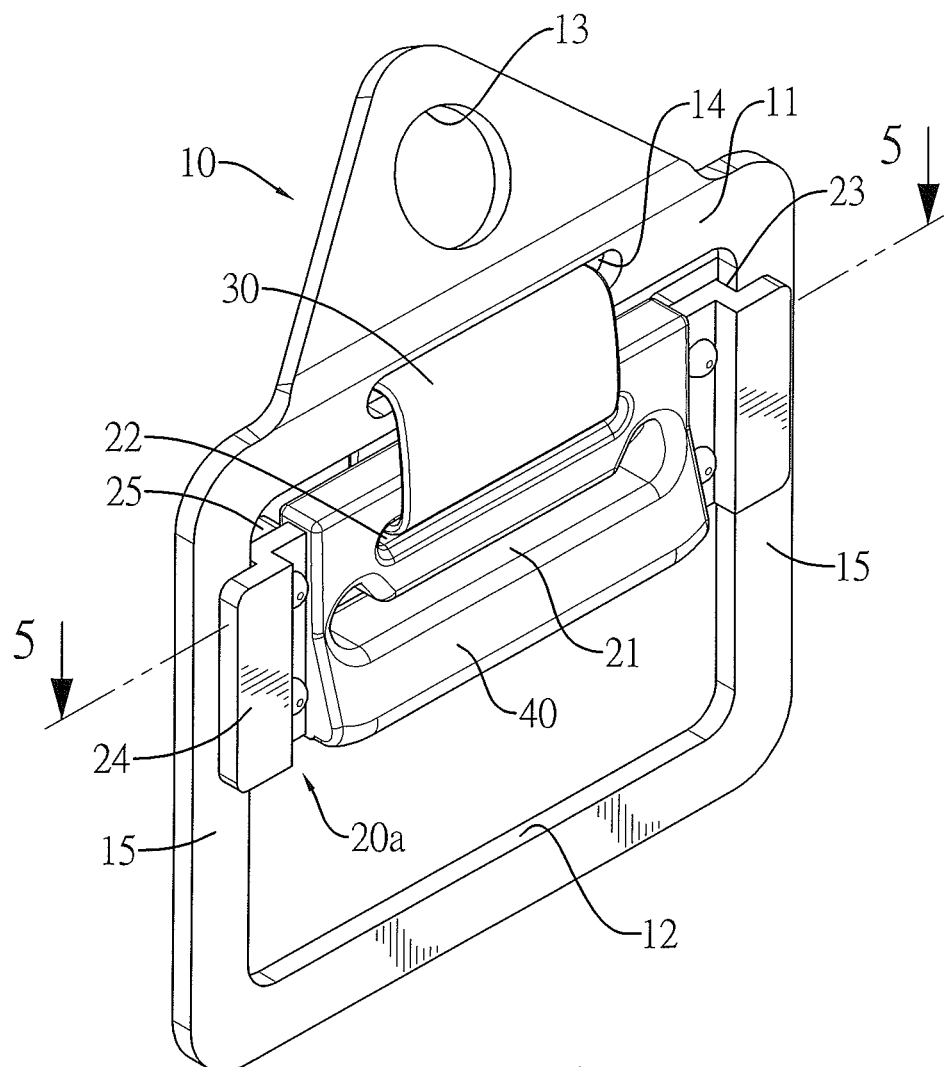
FIG. 4 is a perspective view of a second embodiment of a guiding device for a seat belt system in accordance with the present invention.
Figure 5:
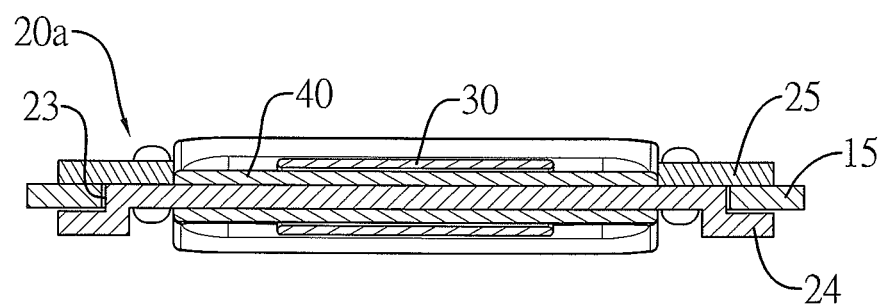
FIG. 5 is a top side view of the guiding device along line 5-5 in FIG. 4.
Figure 8:
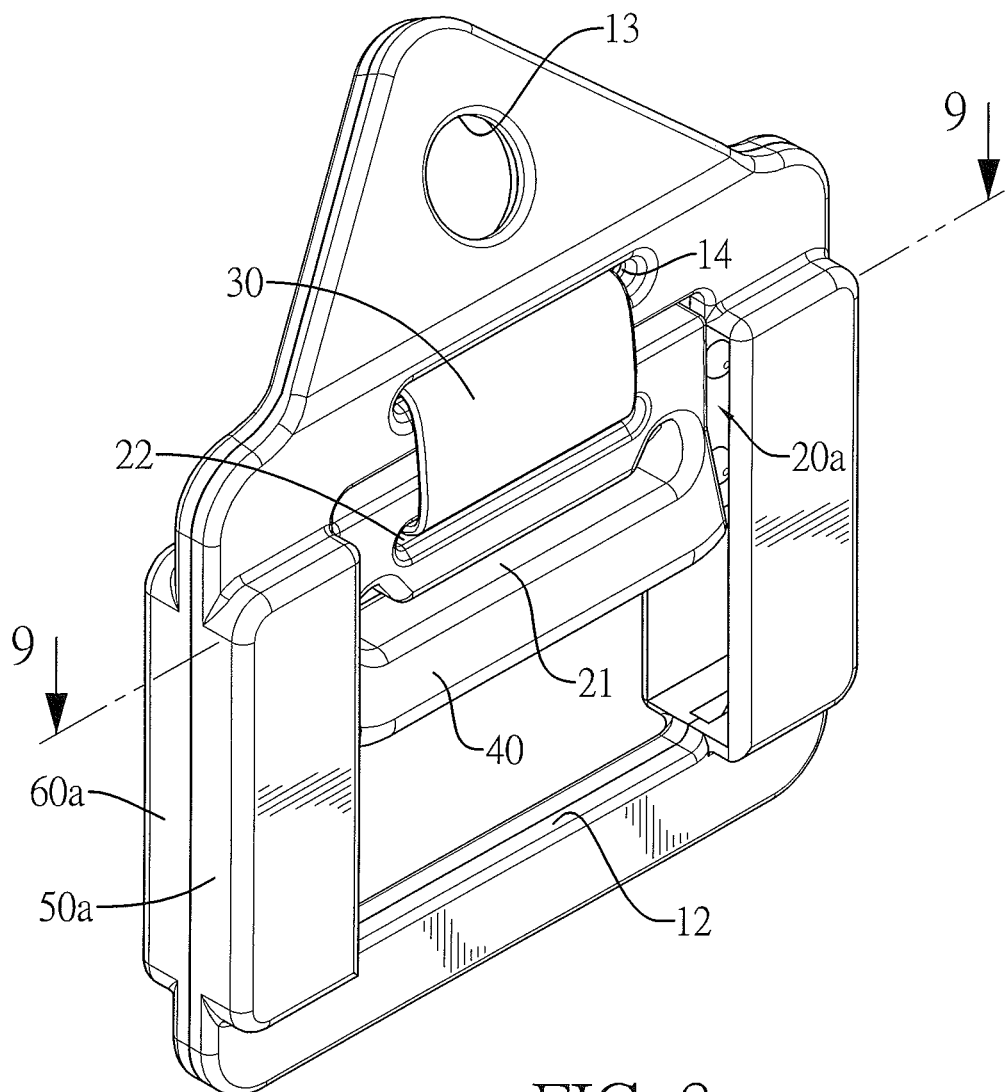
FIG. 8 is a perspective view of a fourth embodiment of a guiding device for a seat belt system in accordance with the present invention.
Figure 9:
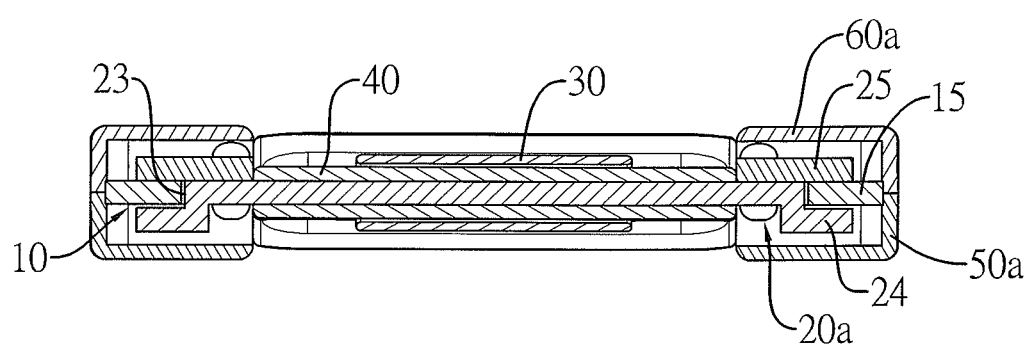
FIG. 9 is a top side view of the guiding device along line 9-9 in FIG. 8.

With reference to FIGS. 4 and 8, the guiding device for a seat belt system has a protective layer 40. The protective layer 40 is formed on the moving seat 20a and encloses the through hole 21. With reference to FIG. 4, in the second embodiment of the guiding device, the protective layer 40 further encloses the second hole 22.

With reference to FIGS. 6 to 9, in the third and fourth embodiments, the guiding device has a first semi-shell 50a and a second semi-shell 60a. The first semi-shell 50a is located at a front surface of the guiding ring 10. The second semi-shell 60a is located at a rear surface of the guiding ring 10 and is secured with the first semi-shell 50a. The activity space 12, the connecting hole 13, the through hole 21, the second hole 22, and the elastic member 30 are covered between the first semi-shell 50a and the second semi-shell 60a.

Figure 10:
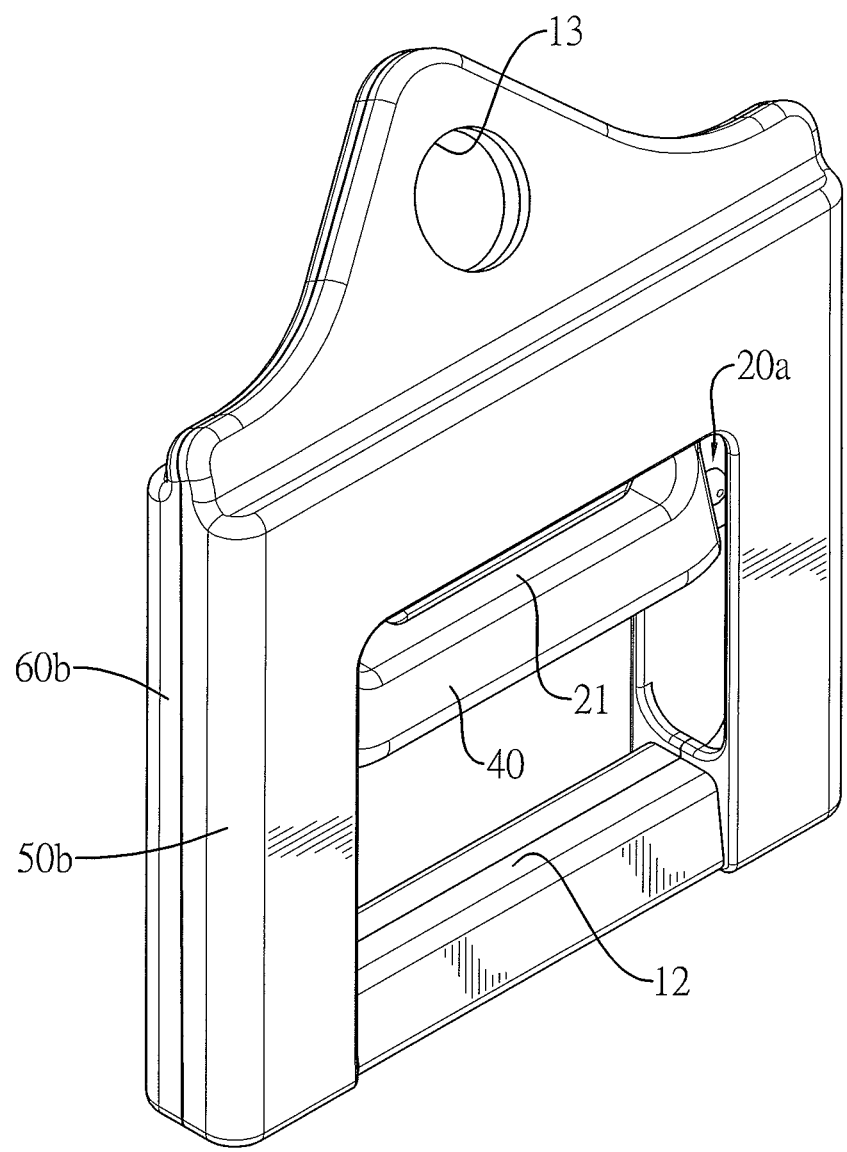
FIG. 10 is a perspective view of a fifth embodiment of a guiding device for a seat belt system in accordance with the present invention.
Figure 11:
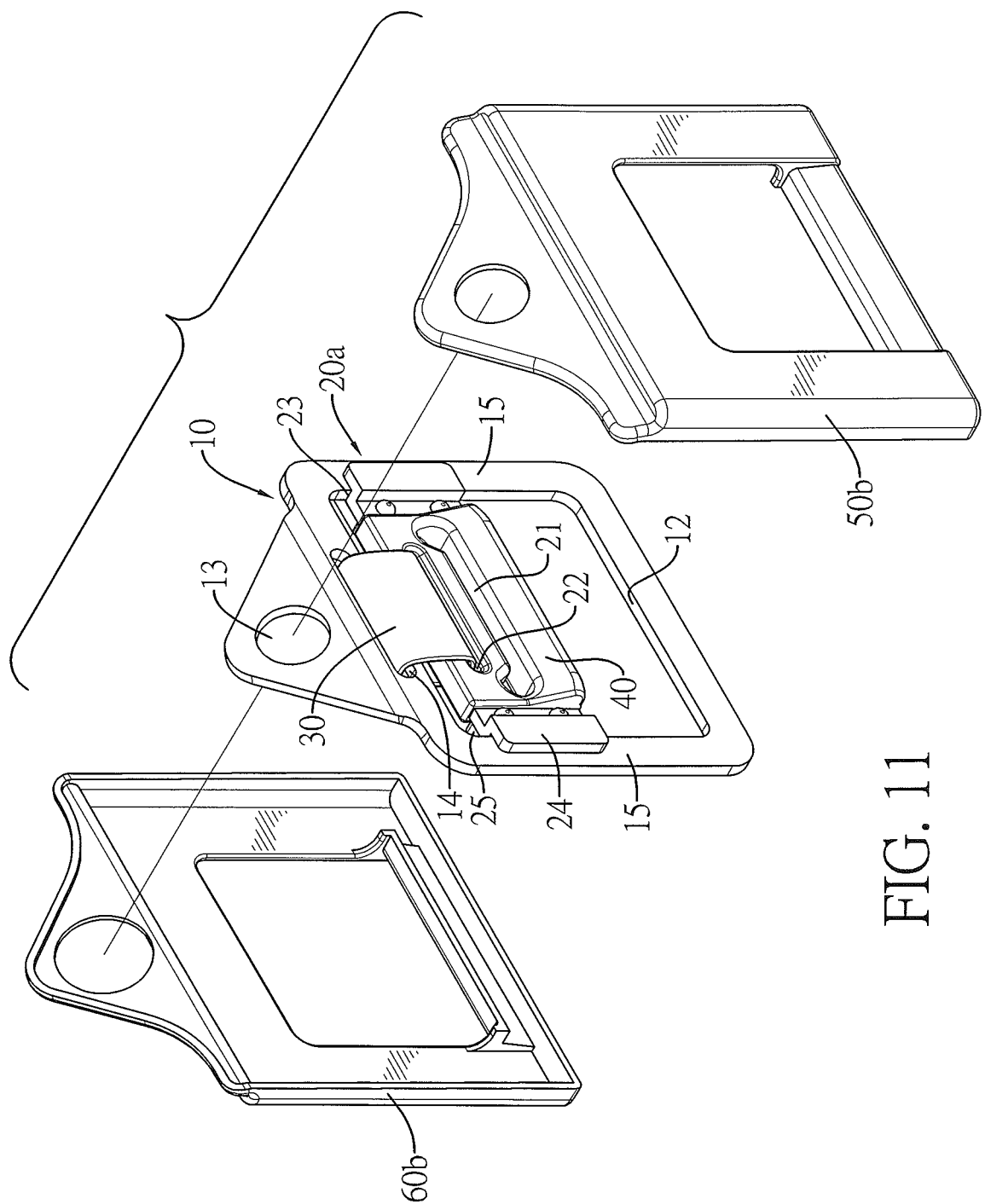
FIG. 11 is an exploded perspective view of the guiding device in FIG. 10.

With reference to FIGS. 10 and 11, in the fifth embodiment, the guiding device has a first semi-shell 50b and a second semi-shell 60b. The first semi-shell 50b is located at the front surface of the guiding ring 10. The second semi-shell 60b is located at the rear surface of the guiding ring 10 and is secured with the first semi-shell 50b. The activity space 12, the connecting hole 13, and the through hole 21 are exposed out of the first semi-shell 50b and the second semi-shell 60b. The first hole 14, the second hole 22, and the elastic member 30 are covered between the first semi-shell 50b and the second semi-shell 60b.

With reference to FIGS. 1 and 3, in the first embodiment, the elastic member 30 is the elastic band, but not limited thereto. The frame 11 of the guiding ring 10 has two longitudinal plate portions 15 disposed at a spaced interval. The moving seat 20a has two side plate portions 24 and two slide grooves 23. The two side plate portions 24 are respectively disposed at the two sides of the moving seat 20a. The two slide grooves 23 are respectively adjacent to the two side plate portions 24 of the moving seat 20a. The two longitudinal plate portions 15 are respectively inserted through the two slide grooves 23 of the moving seat 20a. The moving seat 20a has two stopping plates 25. The stopping plates 25 are respectively disposed at the two sides of the moving seat 20a. The stopping plate 25 and the side plate portion 24 are disposed at a spaced interval. The slide groove 23 is formed between the side plate portion 24 and the stopping plate 25 at the same side of the moving seat 20a. The stopping plate 25 is riveted on or is attached on the moving seat 20a.

Figure 6:
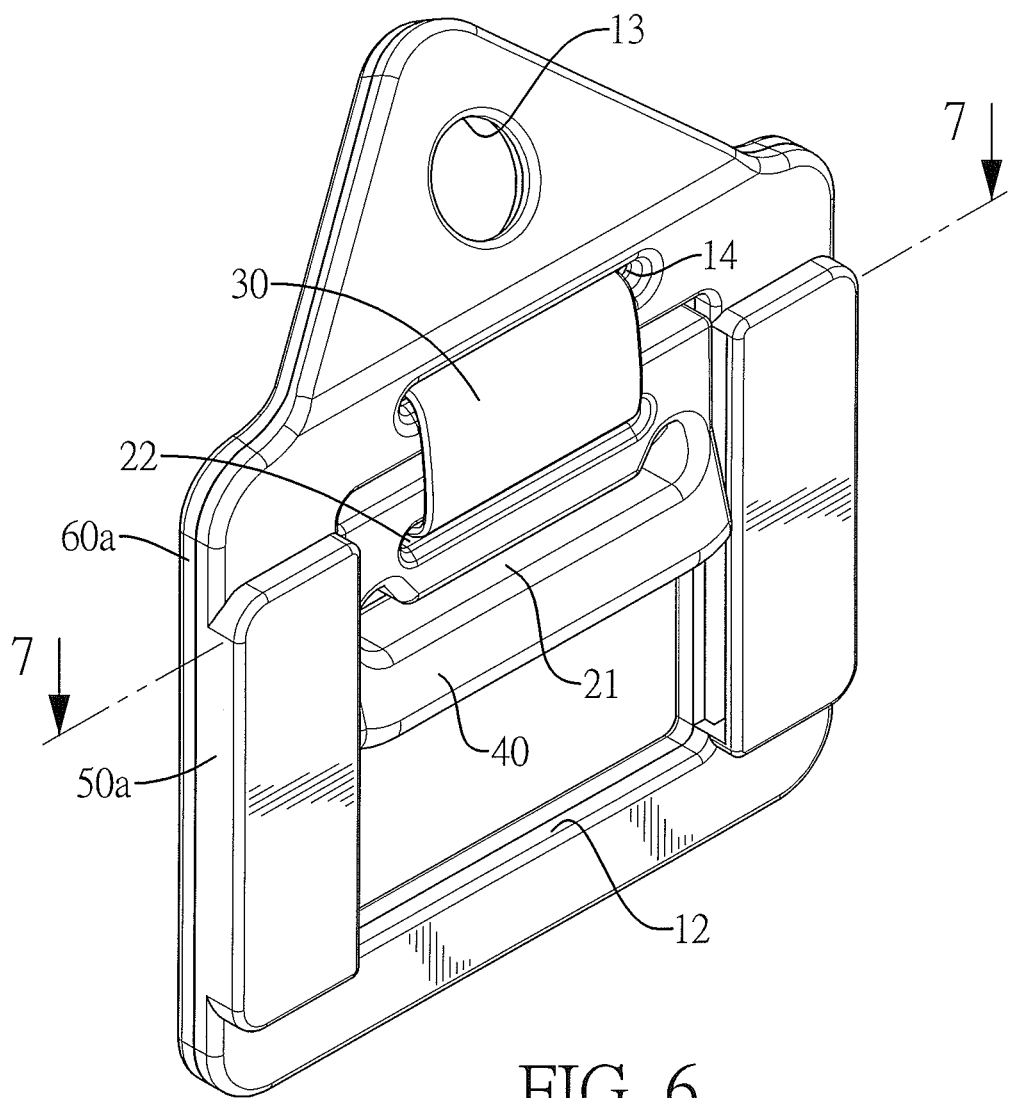
FIG. 6 is a perspective view of a third embodiment of a guiding device for a seat belt system in accordance with the present invention.
Figure 7:
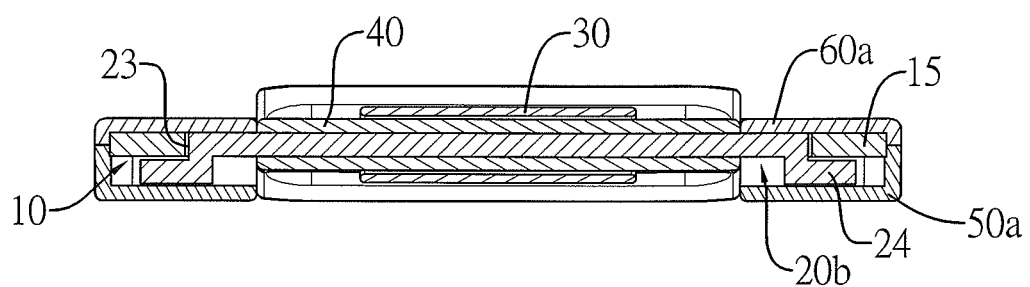
FIG. 7 is a top side view of the guiding device along line 7-7 in FIG. 6.

With reference to FIGS. 6 and 7, in the third embodiment, the first semi-shell 50a and the second semi-shell 60a are mounted on and cover the guiding ring 10. The moving seat 20b does not have the stopping plates 25 as described. Each longitudinal plate portion 15 is located between a corresponding side plate portion 24 and a corresponding second semi-shell 60a.

Figure 12:
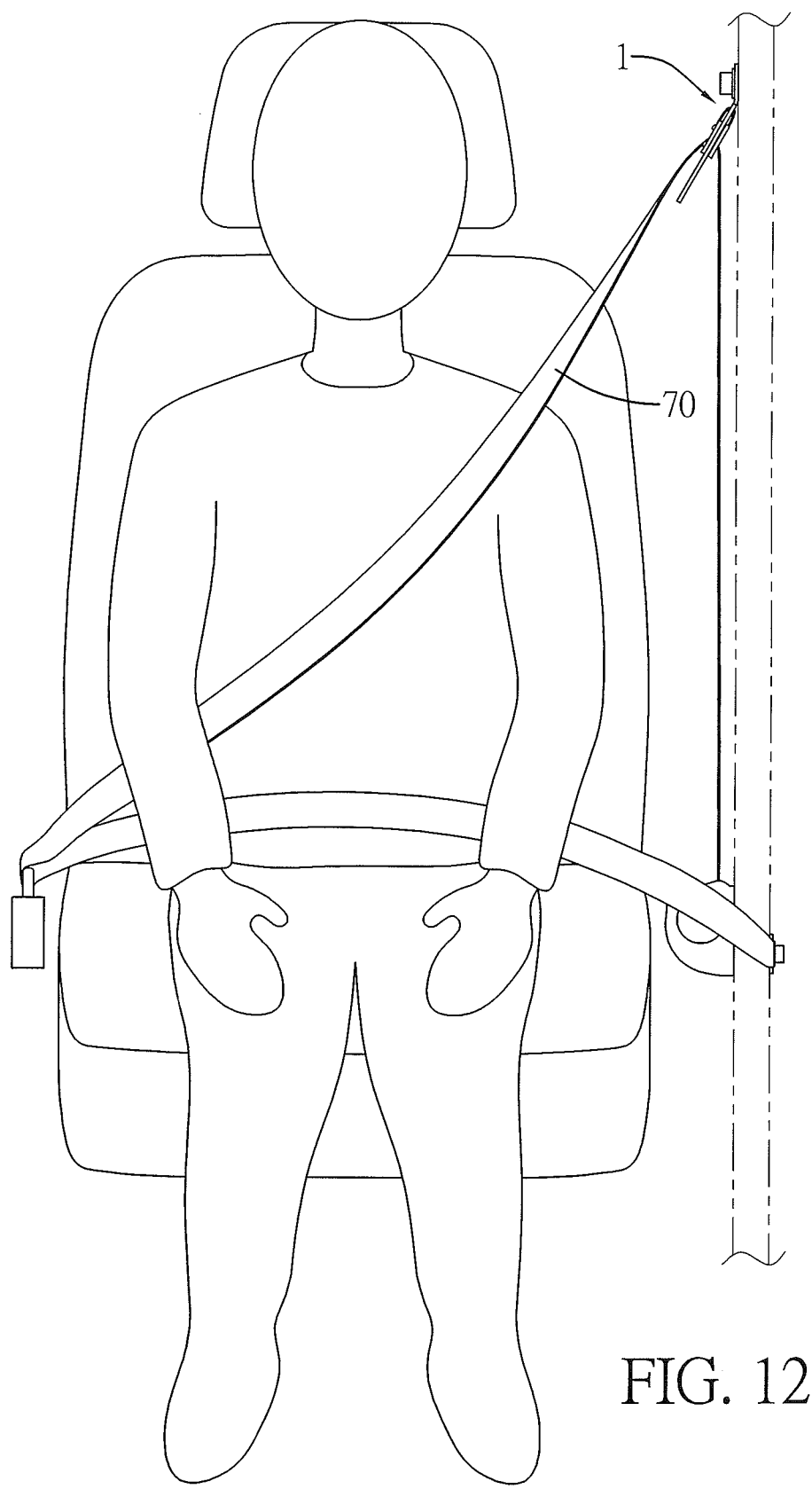
FIG. 12 is an operational side view of the guiding device in FIG. 1, showing the guiding device is assembled on the seat belt system.
Figure 13:
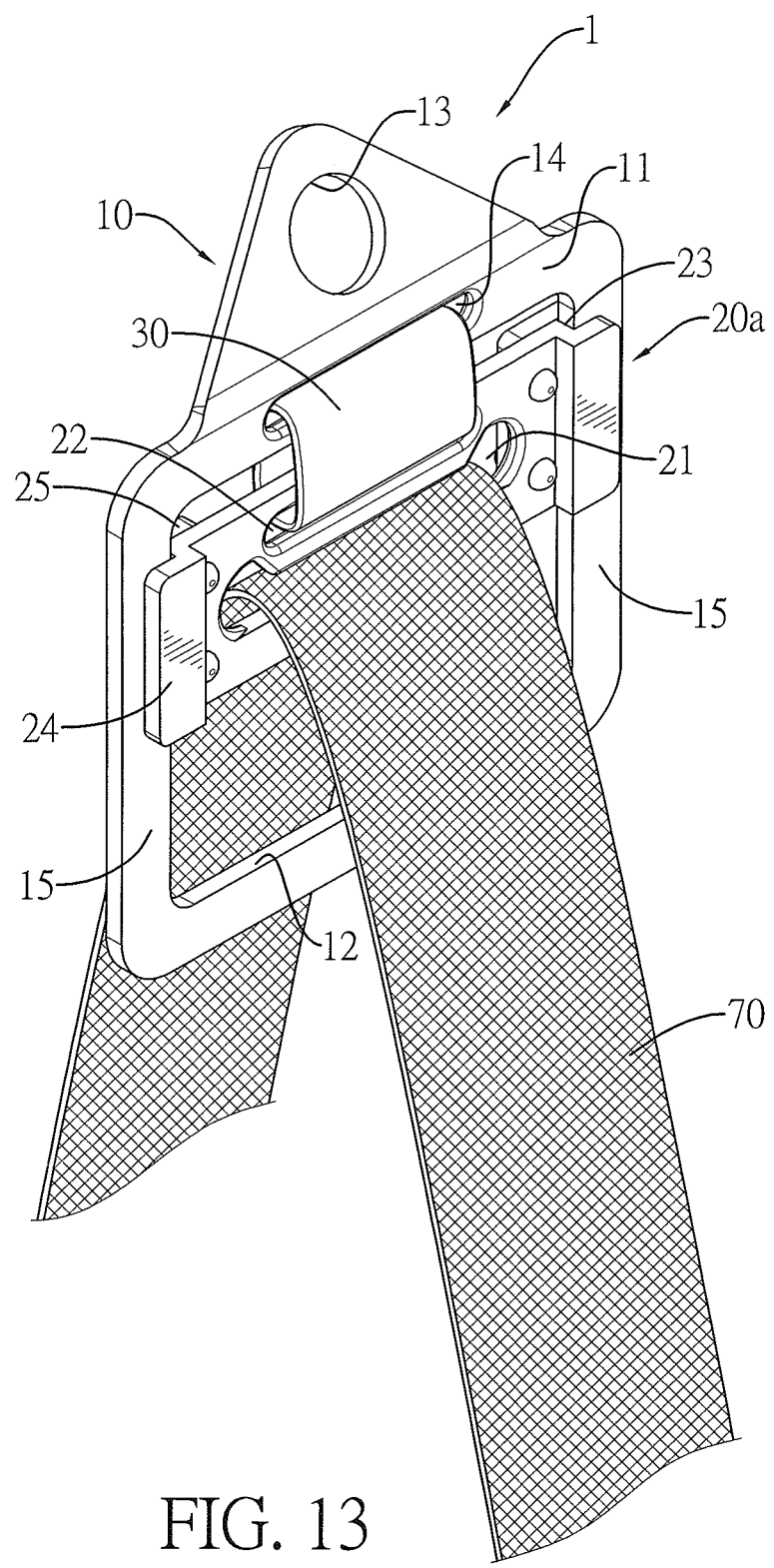
FIG. 13 is an operational perspective view of the guiding device in FIG. 1, showing a webbing is inserted through the guiding device.
Figure 14:
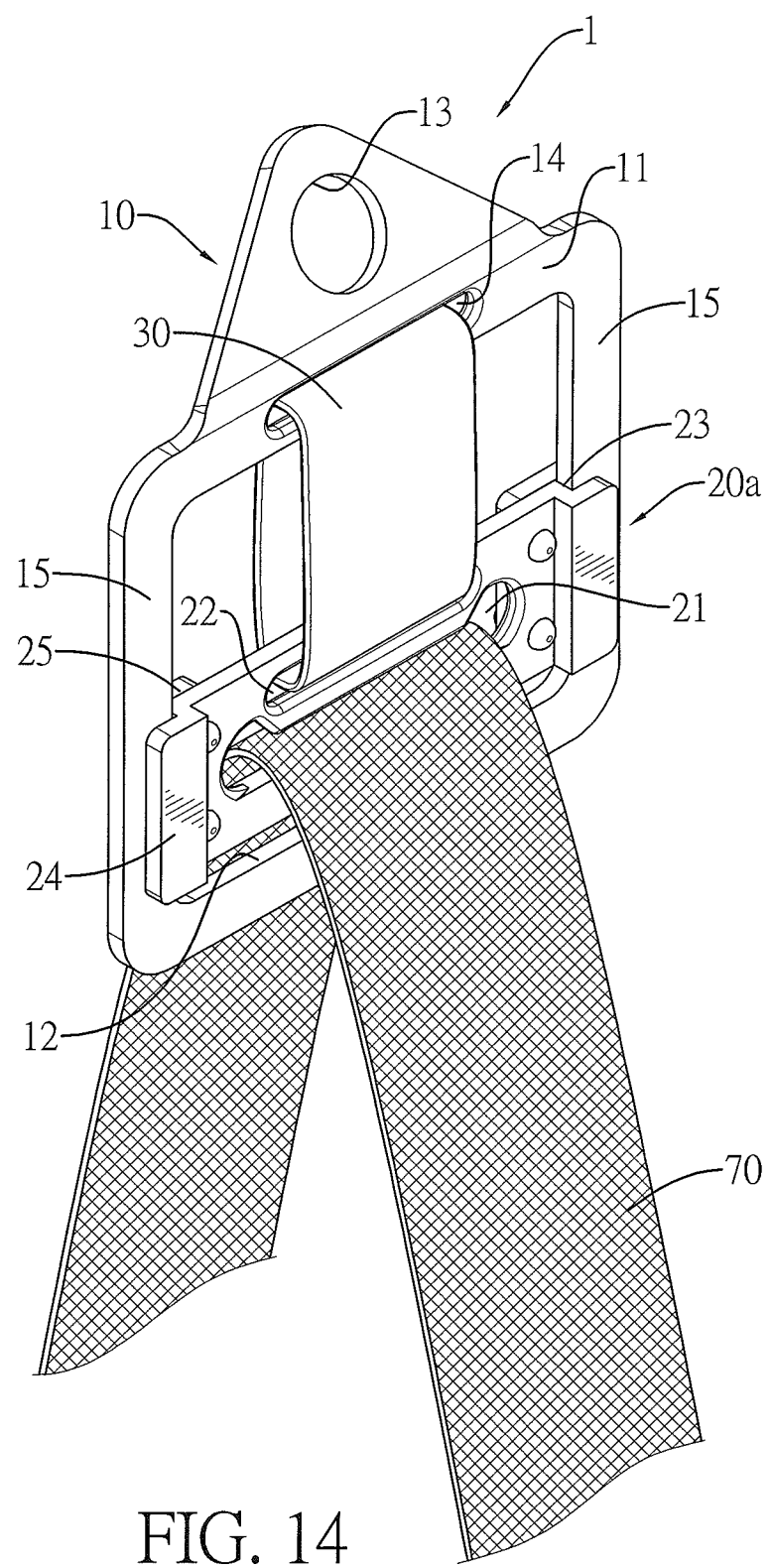
FIG. 14 is an operational perspective view of the guiding device in FIG. 13, showing a moving seat of the guiding device moves downwardly relative to a frame of the guiding device.

With reference to FIGS. 12 and 13, in the first embodiment, the guiding device 1 for a seat belt system is applied to the seat belt system mounted in a vehicle. The guiding ring 10 is mounted in the vehicle. A webbing of the seat belt system is extracted from a retractor of the seat belt system and passes through the through hole 21 of the moving seat 20a. When the occupant is seated in the vehicle and fastens the seat belt, the guiding device 1 for the seat belt system supports the webbing 70 to sustain the force. As the vehicle is braking, inertia carries the occupant to move forward and pulls the webbing 70. With reference to FIG. 14, when the webbing 70 is pulled, the moving seat 20a is guided by the longitudinal plate portion 15 of the guiding ring 10 and moves downwardly in the activity space 12 of the guiding ring 10. Meanwhile, the elastic member 30 is stretched to generate a cushioning elastic force to counteract a part of the pulling force of the webbing 70. The pulling force acted on the guiding device by the webbing 70 is reduced.

Figure 15:
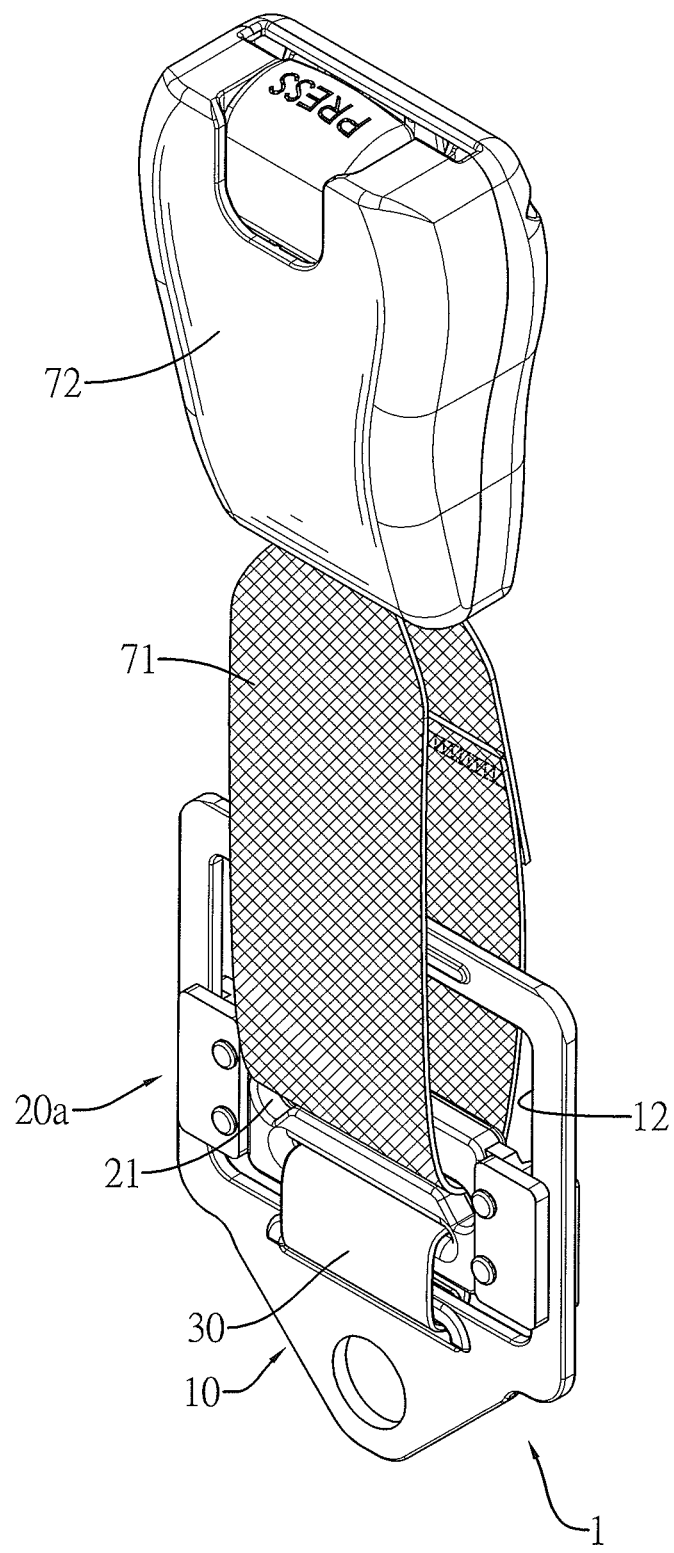
FIG. 15 is an operational view of a sixth embodiment of a guiding device of a seat belt system in accordance with the present invention, showing a connecting webbing is mounted on a buckle and passes through the guiding device.
Figure 16:
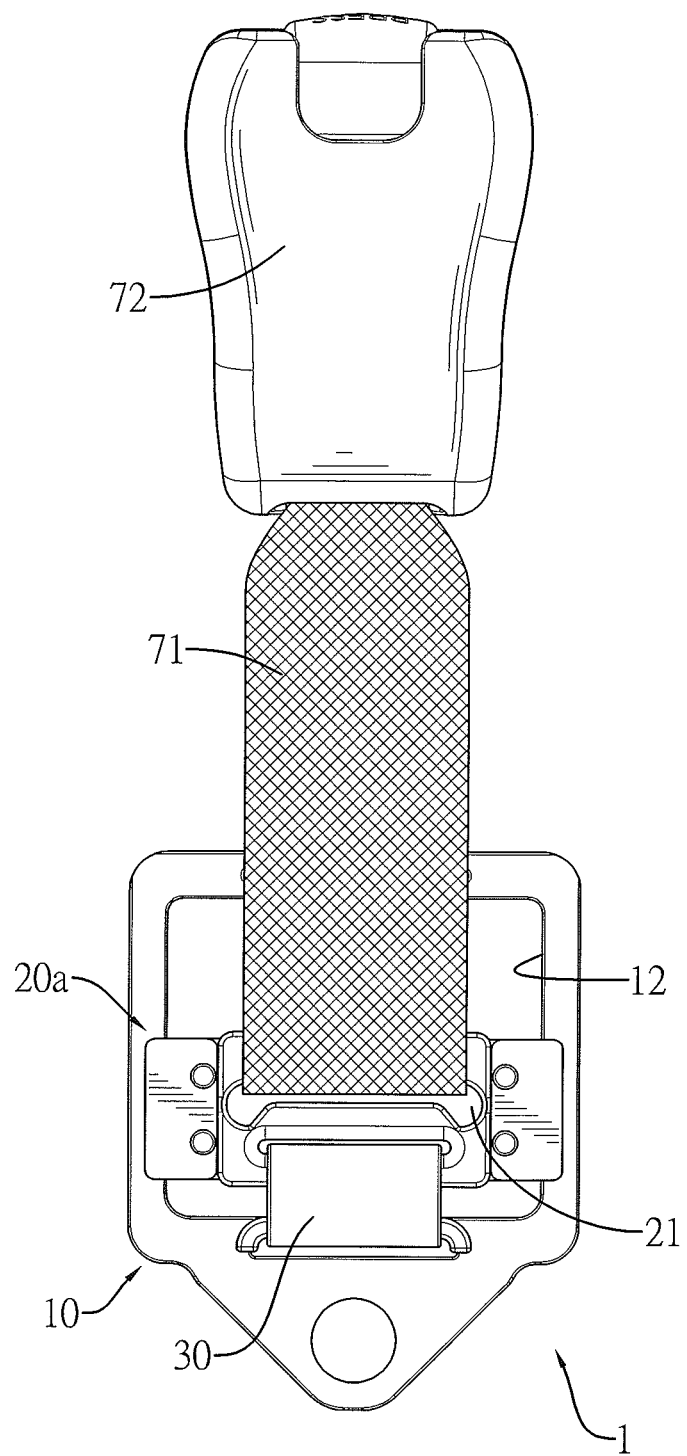
FIG. 16 is a front view of the guiding device in FIG. 15.
Figure 17:
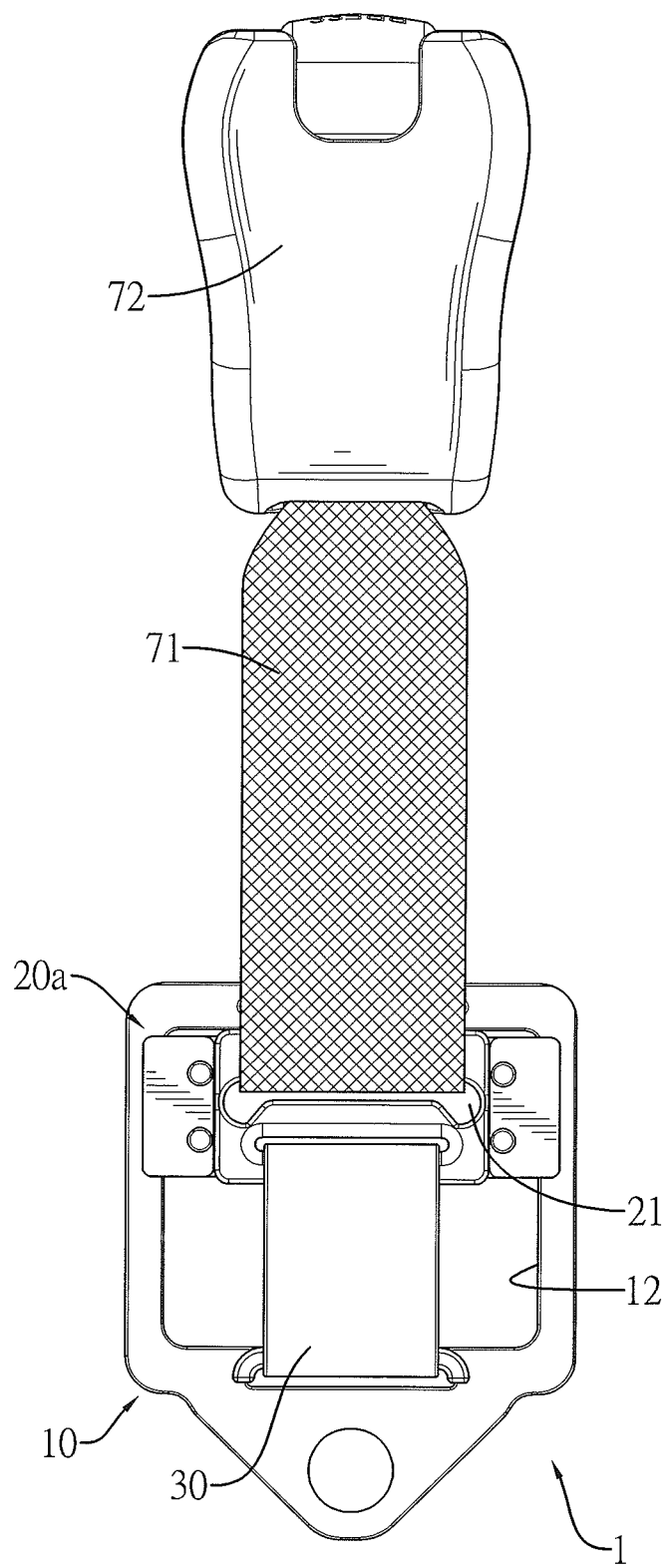
FIG. 17 is a front view of the guiding device in FIG. 15, showing the moving seat of the guiding device moves upwardly.
Figure 18:
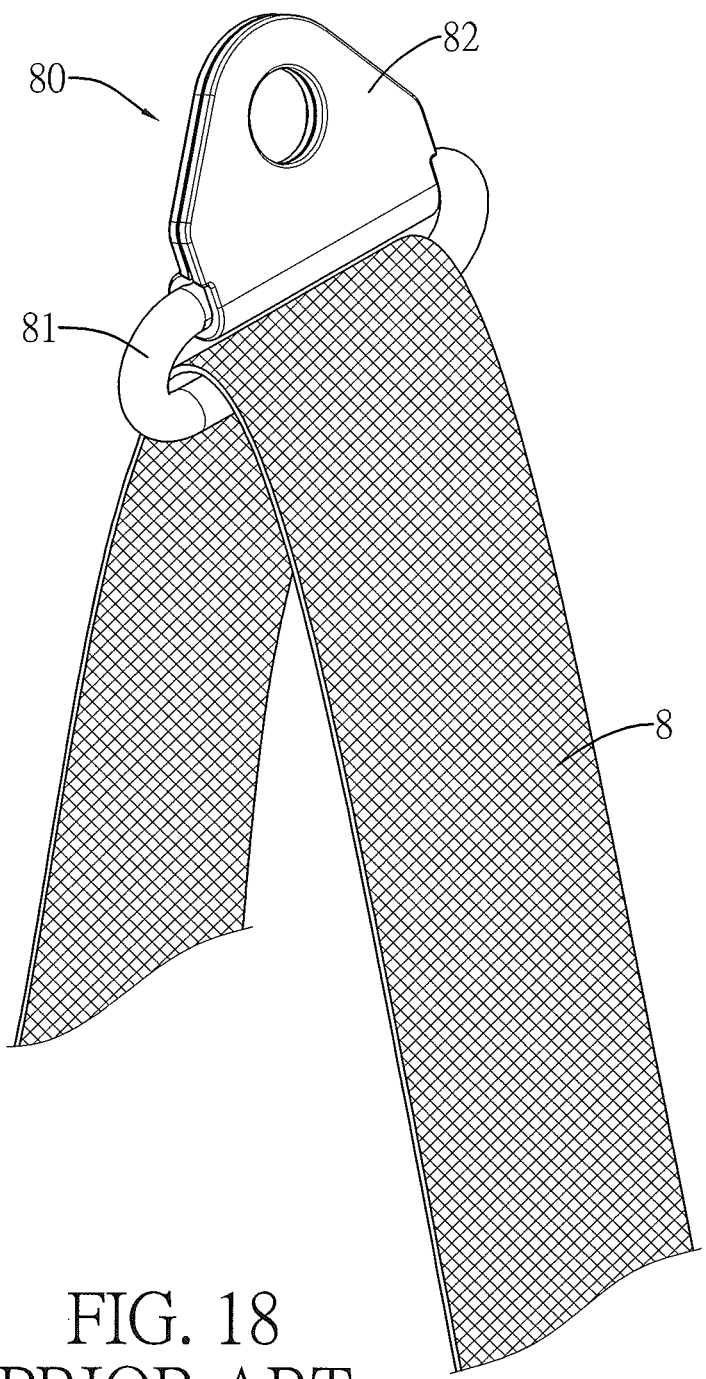
FIG. 18 is a perspective view of a conventional guiding device in accordance with the prior art, shown combined with a webbing.
Figure 19:
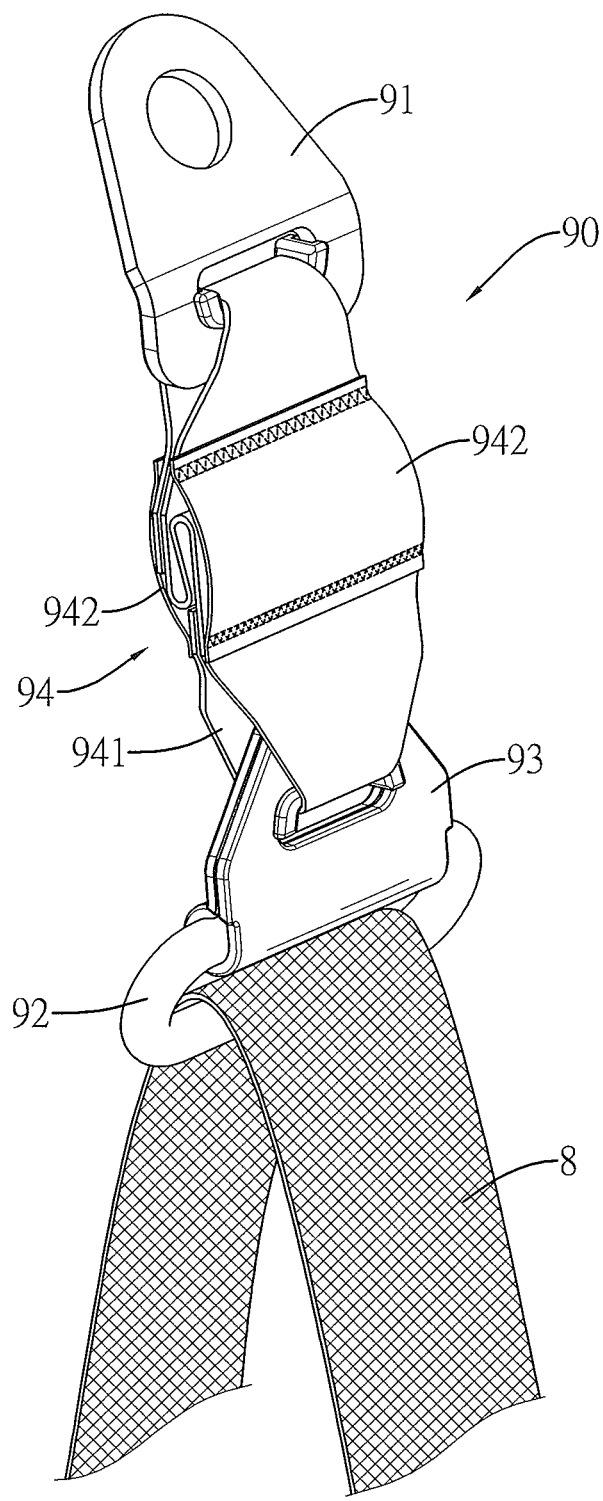
FIG. 19 is a perspective view of another conventional guiding device in accordance with the prior art, shown combined with a webbing.

With reference to FIGS. 15 to 17, the guiding device for a seat belt system may be mounted beside a seat mounted in the vehicle. A connecting webbing 71 is fixedly mounted on a buckle 72 of the seat belt system and passes through the through hole 21 of the moving seat 20a. A tongue of the seat belt may be inserted into the buckle 72. The webbing 70 passes through the tongue. As the vehicle is braking, inertia carries the occupant to move forward and pulls the webbing 70. The tongue, the buckle 72, the connecting webbing 71, and the moving seat 20a are pulled by the webbing 70. The moving seat 20a moves upwardly in the activity space 12 of the guiding ring 10. The elastic member 30 is stretched to generate a cushioning elastic force to counteract a part of the pulling force. The pulling force acted on the guiding device by the webbing 70 is reduced.

Accordingly, the guiding device 1 for a seat belt system is applied to the seat belt system mounted in a vehicle. The guiding ring 10 is mounted in the vehicle. The webbing 70 of the seat belt system can be pulled from a retractor of the seat belt system and is inserted through the moving seat 20a, 20b slidably mounted in the guiding ring 10. The elastic member 30 is connected between the guiding ring 10 and the moving seat 20a, 20b to provide an upward elastic force to the moving seat 20a, 20b. The guiding device supports the webbing 70 to sustain the force. The structure of the guiding device is compact. The manufacture cost of the guiding device is low. The guiding device is small in volume and does not occupy much space. A rigid frame structure provides operation stability when the moving seat 20a, 20b is sliding within the activity space 12 of the guiding ring 10.

Even though the elastic member 30 connected between the guiding ring 10 and the moving seat 20a, 20b is broken and the cushion function is lost, the guiding ring 10 fixedly mounted on the vehicle and the moving seat 20a, 20b mounted in the guiding ring 10 still support the webbing to sustain the force. The function of the seat belt system remains normal without failing. Therefore, the guiding device of the present invention has high value in industrial usage.

What is claimed is:

1. A guiding device for a seat belt system, the guiding device comprising:
   a guiding ring having
      a frame having
         a connecting hole formed through the frame; and
         an activity space formed through the frame and disposed beside the connecting hole;
   a moving seat slidably mounted on the guiding ring, located in the activity space of the guiding ring, being moveable upwardly and downwardly in the activity space of the guiding ring, and having a through hole formed through the moving seat, wherein one of a webbing and a connecting webbing passes through the through hole of the moving seat; and
   an elastic member connected between the guiding ring and the moving seat.

2. The guiding device as claimed in claim 1, wherein
   the guiding ring has a first hole formed through the frame and located between the activity space of the guiding ring and the connecting hole of the frame;
   the moving seat has a second hole formed through the moving seat and located above the through hole of the moving seat; and
   the elastic member is an elastic band and is inserted through the first hole of the guiding ring and the second hole of the moving seat.

3. The guiding device as claimed in claim 2, wherein
   the guiding ring has a front surface and a rear surface; and
   the guiding device has
      a first semi-shell located at the front surface of the guiding ring; and
      a second semi-shell located at the rear surface of the guiding ring and secured with the first semi-shell;

wherein the activity space, the connecting hole, the through hole, the first hole, the second hole, and the elastic member are exposed out of the first semi-shell and the second semi-shell.

4. The guiding device as claimed in claim 3, wherein the moving seat has
two sides; and
two slide grooves respectively formed on the two sides of the moving seat; and
the frame has two longitudinal plate portions disposed at a spaced interval and respectively inserted through the two slide grooves of the moving seat.

5. The guiding device as claimed in claim 3, wherein the moving seat has
two sides;
two side plate portions respectively disposed at the two sides of the moving seat; and
two slide grooves formed on the two sides of the moving seat adjacent the two side plate portions respectively; and
the frame has two longitudinal plate portions disposed at a spaced interval, and the two longitudinal plate portions are respectively inserted through the two slide grooves of the moving seat and respectively located between the two side plate portions and the second semi-shell.

6. The guiding device as claimed in claim 2, wherein the guiding ring has a front surface and a rear surface; and the guiding device has
a first semi-shell located at the front surface of the guiding ring; and
a second semi-shell located at the rear surface of the guiding ring and secured with the first semi-shell;
wherein the activity space, the connecting hole, and the through hole are exposed out of the first semi-shell and the second semi-shell, and the first hole, the second hole and the elastic member are covered between the first semi-shell and the second semi-shell.

7. The guiding device as claimed in claim 6, wherein the moving seat has
two sides; and
two slide grooves respectively formed on the two sides of the moving seat; and
the frame has two longitudinal plate portions disposed at a spaced interval and respectively inserted through the two slide grooves of the moving seat.

8. The guiding device as claimed in claim 2, wherein the moving seat has
two sides; and
two slide grooves respectively formed on the two sides of the moving seat; and
the frame has two longitudinal plate portions disposed at a spaced interval and respectively inserted through the two slide grooves of the moving seat.

9. The guiding device as claimed in claim 8, wherein the moving seat has
two side plate portions respectively disposed at the two sides of the moving seat; and
two stopping plates respectively disposed at the two sides of the moving seat;
wherein the stopping plate and the side plate portion are defined at the same side of the moving seat, and are disposed at a spaced interval, and the slide groove is formed between the side plate portion and the stopping plate at the same side of the moving seat.

10. The guiding device as claimed in claim 2, wherein the guiding device has a protective layer mounted on the moving seat and enclosing the through hole.

11. The guiding device as claimed in claim 1, wherein the guiding ring has a front surface and a rear surface; and the guiding device has
a first semi-shell located at the front surface of the guiding ring; and
a second semi-shell located at the rear surface of the guiding ring and secured with the first semi-shell;
wherein the activity space, the connecting hole, and the through hole are exposed out of the first semi-shell and the second semi-shell.

12. The guiding device as claimed in claim 11, wherein the moving seat has
two sides; and
two slide grooves respectively formed on the two sides of the moving seat; and
the frame has two longitudinal plate portions disposed at a spaced interval and respectively inserted through the two slide grooves of the moving seat.

13. The guiding device as claimed in claim 12, wherein the moving seat has
two side plate portions respectively disposed at the two sides of the moving seat; and
two stopping plates respectively disposed at the two sides of the moving seat;
wherein the stopping plate and the side plate portion are defined at the same side of the moving seat, and are disposed at a spaced interval, and the slide groove is formed between the side plate portion and the stopping plate at the same side of the moving seat.

14. The guiding device as claimed in claim 11, wherein the moving seat has
two sides;
two side plate portions respectively disposed at the two sides of the moving seat; and
two slide grooves formed on the two sides of the moving seat adjacent the two side plate portions respectively; and
the frame has two longitudinal plate portions disposed at a spaced interval, and the two longitudinal plate portions are respectively inserted through the two slide grooves of the moving seat and respectively located between the two side plate portions and the second semi-shell.

15. The guiding device as claimed in claim 14, wherein the guiding device has a protective layer mounted on the moving seat and enclosing the through hole.

16. The guiding device as claimed in claim 11, wherein the guiding device has a protective layer mounted on the moving seat and enclosing the through hole.

17. The guiding device as claimed in claim 1, wherein the moving seat has
two sides; and
two slide grooves respectively formed on the two sides of the moving seat; and
the frame has two longitudinal plate portions disposed at a spaced interval and respectively inserted through the two slide grooves of the moving seat.

18. The guiding device as claimed in claim 17, wherein the moving seat has
two side plate portions respectively disposed at the two sides of the moving seat; and
two stopping plates respectively disposed at the two sides of the moving seat;

wherein the stopping plate and the side plate portion are defined at the same side of the moving seat, and are disposed at a spaced interval, and the slide groove is formed between the side plate portion and the stopping plate at the same side of the moving seat.

19. The guiding device as claimed in claim 17, wherein the guiding device has a protective layer mounted on the moving seat and enclosing the through hole.

20. The guiding device as claimed in claim 1, wherein the guiding device has a protective layer mounted on the moving seat and enclosing the through hole.

* * * * *